(12) United States Patent
Ruble et al.

(10) Patent No.: US 9,178,717 B1
(45) Date of Patent: Nov. 3, 2015

(54) SYSTEMS AND METHODS FOR ENABLING LEAF ISOLATION IN A MULTI-NODE TREE NETWORK

(75) Inventors: Andrew T. Ruble, Elkmont, AL (US); Daniel Josiah Barnes, Harvest, AL (US); Chad Anthony Dieselberg, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 487 days.

(21) Appl. No.: 13/082,061

(22) Filed: Apr. 7, 2011

(51) Int. Cl.
*H04L 12/46* (2006.01)
*H04L 29/06* (2006.01)
*H04L 12/721* (2013.01)

(52) U.S. Cl.
CPC ............. *H04L 12/4645* (2013.01); *H04L 45/66* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 6,414,956 B1 * | 7/2002 | Szczepanek | ............ | 370/392 |
| 6,430,621 B1 * | 8/2002 | Srikanth et al. | ............ | 709/238 |
| 7,283,524 B2 | 10/2007 | Orava et al. | ............ | 370/389 |
| 7,724,670 B2 * | 5/2010 | Nilakantan et al. | ............ | 370/235 |
| 7,995,488 B2 * | 8/2011 | Ding et al. | ............ | 370/245 |
| 8,737,399 B2 * | 5/2014 | Yong | ............ | 370/392 |
| 2005/0163100 A1 | 7/2005 | Orava et al. | | |
| 2005/0220096 A1 * | 10/2005 | Friskney et al. | ............ | 370/389 |
| 2010/0182913 A1 | 7/2010 | Ding et al. | | |
| 2011/0058559 A1 * | 3/2011 | Oman | ............ | 370/395.53 |
| 2011/0164617 A1 * | 7/2011 | Yong | ............ | 370/392 |
| 2012/0106555 A1 * | 5/2012 | Gumaste | ............ | 370/395.53 |

OTHER PUBLICATIONS http://www.ieee802.org/1/files/public/docs2010/liaison-sg15-q915-usage-of-cfi-bit-for-leaf-indication-ols146-0310.pdf, ITU Telecommunication Standardization Sector, "Use of Leaf Indicator Bit," pp. 1-3.

* cited by examiner

*Primary Examiner* — Timothy J Weidner
(74) *Attorney, Agent, or Firm* — Maynard Cooper & Gale, P.C.; Jon E. Holland (57) ABSTRACT

The present disclosure generally pertains to systems and methods for enabling leaf isolation in a multi-node tree network. In one exemplary embodiment, an Ethernet virtual network (EVC) system has a multi-node E-Tree network comprising a plurality of nodes (e.g., switches), including at least one ingress node and at least one egress node. The ingress node is configured to receive a data packet to be communicated through the E-Tree network and to modify a field, such as the tag protocol identifier (TPID), in the packet's header to indicate whether the data packet is received by the ingress node via a leaf port. As the data packet is communicated through the E-Tree network, the nodes determine the leaf status of the packet based on the modified field thereby enabling the nodes to enforce leaf isolation rules. The egress node upon receiving the packet is configured to adjust the modified field as appropriate such that the field on egress matches the field on ingress. Accordingly, the use of the field as a leaf indicator in the E-Tree network should not affect the ability of downstream components to properly handle the data packet.

16 Claims, 6 Drawing Sheets

/ 48

| Source Port | TPID | VLAN tag | Dest. Add. | Dest. Port |
|---|---|---|---|---|
| 42 | DC | 110 | A | 43 |
| 42 | DC | 110 | UK | 43, 41 |
| 43 | 8100 | 110 | B | 42 |
| 43 | 8100 | 110 | UK | 42, 41 |
| 41 | DC | 110 | B | 42 |
| 41 | 9100 | 110 | A | 43 |
| 41 | 9100 | 110 | UK | 42, 43 |
| 41 | 8100 | 110 | UK | 42 |

| Source Port | TPID | VLAN tag | Dest. Add. | Dest. Port |
|---|---|---|---|---|
| 22 | DC | 110 | B | 23 |
| 22 | DC | 110 | A | 23 |
| 22 | DC | 110 | UK | 23, 21 |
| 21 | DC | 110 | B | 23 |
| 21 | DC | 110 | A | 23 |
| 21 | DC | 110 | UK | 22, 23 |
| 23 | DC | 110 | UK | 22, 21 |

| Source Port | TPID | VLAN tag | Dest. Add. | Dest. Port |
|---|---|---|---|---|
| 32 | 8100 | 110 | B | 31 |
| 32 | 8100 | 110 | A | 31 |
| 32 | 8100 | 110 | UK | 31 |
| 31 | 8100 | 110 | UK | 32, 33 |

| Source Port | TPID | VLAN tag | Dest. Add. | Dest. Port |
|---|---|---|---|---|
| 42 | DC | 110 | A | 43 |
| 42 | DC | 110 | UK | 43, 41 |
| 43 | 8100 | 110 | B | 42 |
| 43 | 8100 | 110 | UK | 42, 41 |
| 41 | DC | 110 | B | 42 |
| 41 | 9100 | 110 | A | 43 |
| 41 | 9100 | 110 | UK | 42, 43 |
| 41 | 8100 | 110 | UK | 42 |

SYSTEMS AND METHODS FOR ENABLING LEAF ISOLATION IN A MULTI-NODE TREE NETWORK

RELATED ART

In a rooted-multipoint Ethernet virtual circuit (EVC) system, the ports of one or more switches within the system may be designated as leaf ports or root ports. Traffic that is received via a leaf port on ingress to the system may not be transmitted to another leaf port. In this regard, such traffic may be transmitted on egress from the system only via a root port. However, traffic that is received via a root port on ingress may be transmitted to leaf ports and/or root ports. Such rules effectively isolate the leaf ports from one another and will be referred to herein as the "leaf isolation rules."

Implementing leaf isolation rules on a single switch is not particularly problematic. In this regard, a switch is typically aware of the leaf status of its ports (i.e., whether each port is a root port or a leaf port) and, thus, can effectively enforce the leaf isolation rules. However, implementing leaf isolation rules becomes more problematic when the system comprises aggregated switches. In this regard, to enforce the leaf isolation rules for a packet from another switch, a switch needs to know the leaf status of the ingress port, but such port resides in another switch. It is possible to provision each switch with information about the leaf status of the ports of other switches to enable leaf isolation and then to have the switches learn the ingress connections for various source addresses. However, the design and provisioning of the switches would be burdensome and complicated, and the number of entries in the forwarding tables would be drastically increased, particularly for a large number of aggregated switches. Further, during learning, enforcement of the leaf isolation rules would be problematic.

In an effort to alleviate some of the problems with enforcement of leaf isolation in an aggregated switch environment, there exists a proposal to modify the format of an Ethernet packet, as defined by I.E.E.E. 802.1, to overwrite the CFI/DEI bit within a virtual local area network (VLAN) tag to indicate the leaf status of the packet effectively changing the CFI/DEI bit to a leaf indicator bit. According to such proposal, upon ingress to a rooted-multipoint Ethernet system having aggregated switches, the ingress switch is configured to set the leaf indicator bit to a value indicative of whether the packet is received on ingress via a leaf port. Other switches, based on the leaf indicator bit, can then make forwarding decisions to enforce the leaf isolation rules. However, such techniques sacrifice the information indicated by the CFI/DEI bit, which may be used by downstream components. As an example, a downstream policer may use the CFI/DEI bit to make dropping decisions when there is congestion in the network. Although the proposed modification of the CFI/DEI bit of the VLAN tag may not cause data errors if implemented, it nevertheless may affect the operation of the network and, in particular, which packets are dropped during congestion.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for enabling leaf isolation in a multi-node tree network. In one exemplary embodiment, an Ethernet virtual circuit (EVC) system has a multi-node E-Tree network comprising a plurality of nodes (e.g., switches), including at least one ingress node and at least one egress node. The ingress node is configured to receive a data packet to be communicated through the E-Tree network and to modify a field, such as the tag protocol identifier (TPID), in the packet's header to indicate whether the data packet is received by the ingress node via a leaf port. As the data packet is communicated through the E-Tree network, the nodes determine the leaf status of the packet based on the modified field thereby enabling the nodes to enforce leaf isolation rules. The egress node upon receiving the packet is configured to adjust the modified field as appropriate such that the field on egress matches the field on ingress. Accordingly, the use of the field as a leaf indicator in the E-Tree network should not affect the ability of downstream components to properly handle the data packet.

Figure 1:
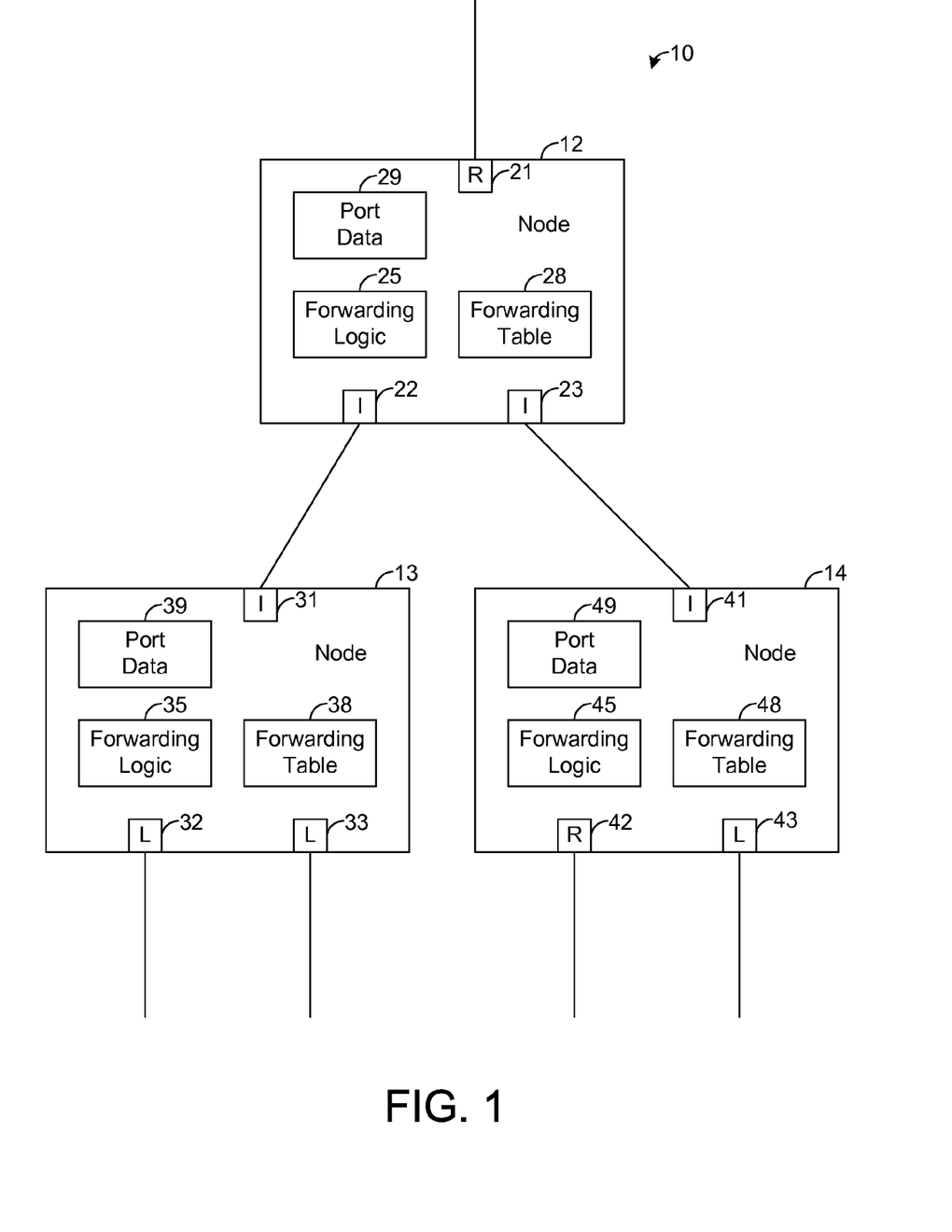
FIG. 1 is a block diagram illustrating an exemplary embodiment of a tree network.

FIG. 1 depicts an exemplary embodiment of a tree network 10 having a plurality of nodes 12-14, such as switches, and implementing a virtual circuit. In one exemplary embodiment, the network 10 is an E-Tree network that implements an Ethernet virtual circuit (EVC), but other types of tree networks and virtual circuits are possible in other embodiments. For illustrative purposes, it will be assumed hereafter that the network 10 implements an EVC.

The exemplary network 10 has three nodes 12-14, but the network 10 can have any number of nodes in other embodiments. Further, each of the nodes 12-14 shown by FIG. 1 is on an edge of the network 10, but the system 10 may have any number of intermediate nodes (not shown) between the edge nodes 12-14 and/or may have other numbers of edge nodes in other embodiments. Each node 12-14 has three ports that are members of the EVC. As will be described in more detail below, each port at an edge of the network 10 is designated to be either a root port (R) or a leaf port (L). A port of one node coupled to a port of another node within the tree network 10 is designated to be neither a root port nor a leaf port and is referred to herein as an "intermediate port" (I).

The exemplary node 12 shown by FIG. 1 has a root port 21 at an edge of the network 10 and two intermediate ports 22-23. The node 12 also has forwarding logic 25 that is configured to forward data packets among the ports 21-23 based on a forwarding table 28 and port data 29. In this regard, the forwarding table 28 maps packet header information, such as destination addresses, to ports 21-23 of the node 12. Thus, when a packet is received by the forwarding logic 25, the forwarding logic 25 compares information in the packet's header to the forwarding table 28 and determines to which ports 21-23 the packet should be forwarded based on the comparison.

Figure 2:
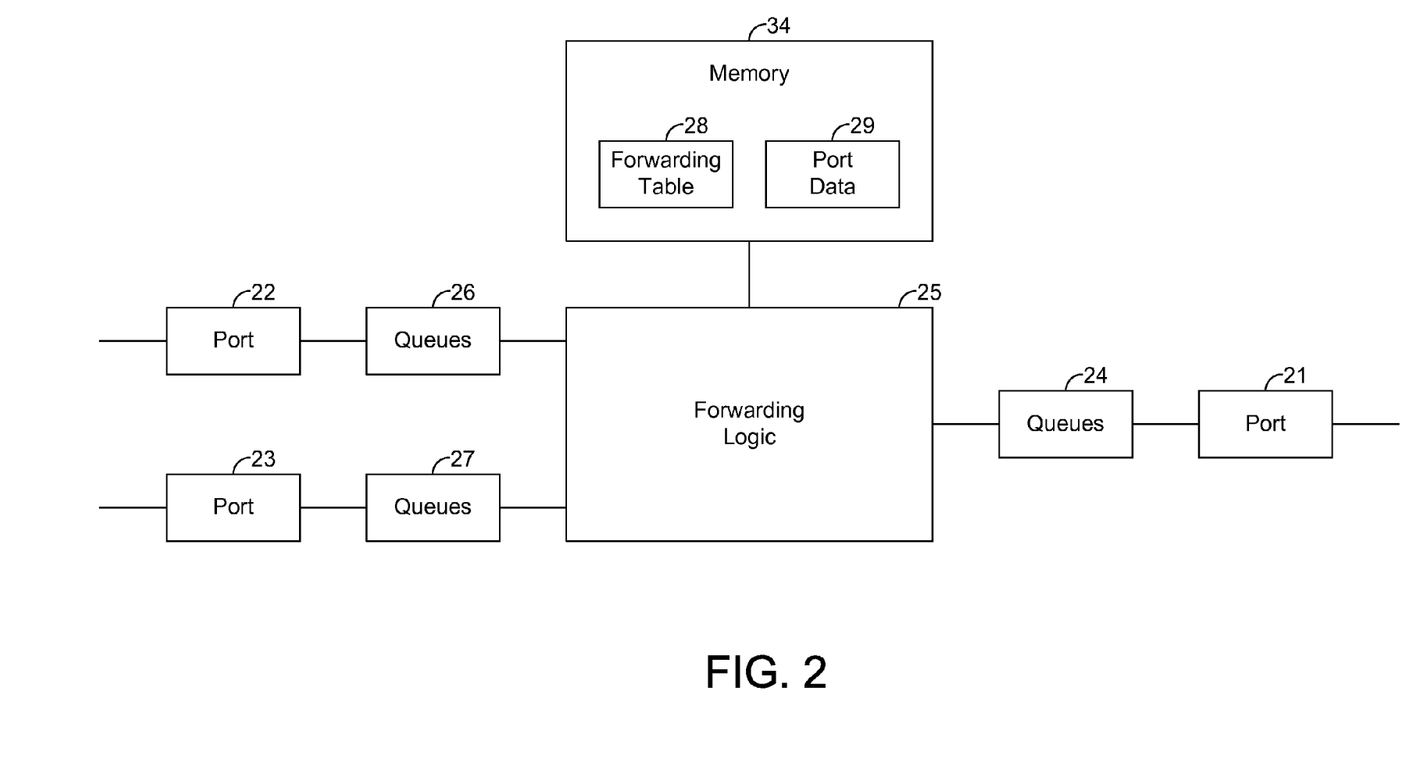
FIG. 2 is a block diagram illustrating an exemplary embodiment of a node in a tree network, such as is depicted by FIG. 1.

FIG. 2 depicts an exemplary embodiment of the node 12. Each port 21-23 is coupled to the forwarding logic 25 through a respective set of queues 24, 26, and 27, which buffer the packets transmitted to the ports 21-23. When the forwarding logic 25 receives a packet, the forwarding logic 25 accesses the forwarding table 28, which is stored in memory 34 to determine port identifiers that identify the port or ports to which the packet is to be forwarded. For each such port identifier, the forwarding logic 25 forwards the packet to a queue feeding the identified port.

Note that the forwarding logic 25 can be implemented in hardware, software, firmware, or any combination thereof. In one exemplary embodiment, the forwarding logic 25 is implemented in hardware, but other implementations are possible in other embodiments. The node 12 may comprise various components not specifically shown by FIG. 2, such as policers, shapers, limiters, and other devices for controlling the flow of data through the node 12.

Referring again to FIG. 1, the exemplary node 13 has an intermediate port 31 coupled to the intermediate port 22 of the node 12, and the node 13 has two leaf ports 32-33 at an edge of the network 10. The node 13 also has forwarding logic 35 that is configured to forward data packets among the ports 31-33 based on a forwarding table 38 and port data 39, similar to the node 12, and the configuration of the node 13 may be similar or identical to that shown by FIG. 2 for the node 12.

The exemplary node 14 has an intermediate port 41 coupled to the intermediate port 23 of the node 12, and the node 14 has a root port 42 and a leaf port 43 at an edge of the network 10. The node 14 also has forwarding logic 45 that is configured to forward data packets among the ports 41-43 based on a forwarding table 48 and port data 49, similar to the node 12, and the configuration of the node 14 may be similar or identical to that shown by FIG. 2 for the node 12.

For illustrative purposes, it will be assumed hereafter that all of the ports 21-23, 31-33, and 41-43 shown by FIG. 1 are members of the same EVC. Unless otherwise indicated hereafter, it will be assumed that the packets described herein are carried by such EVC. In this regard, the EVC is identified by a particular virtual local area network (VLAN) tag, such as an S-tag, and each described packet has such VLAN tag in its header for forwarding decisions.

Note that there are generally three types of packets communicated by the exemplary network 10 of FIG. 1: broadcast, multicast, and unicast. The packet's type is indicated by a field in the packet's header. In general, when a node 12-14 receives a broadcast or multicast packet carried by an EVC, the node 12-14 forwards the packet to all of its ports that are members of the EVC except for the port that received the packet on ingress to the node 12-14. For a unicast packet, the node 12-14 forwards the packet only to the ports mapped by the node's forwarding table to the packet's destination address or other information in the packet's header. As an example, in one exemplary embodiment, the forwarding table 28 of the node 12 has a plurality of entries in which each entry comprises various header information, such as a destination address and/or a VLAN tag, and at least one port identifier in which each port identifier uniquely identifies a port 21-23 of the node 12. The forwarding logic 25 searches for an entry corresponding to the packet's header information and then forwards the packet to the port or ports identified by the at least one port identifier in the corresponding entry. For example, the forwarding logic 25 may use the destination address and the VLAN tag of the packet as a key to lookup the port identifier or identifiers correlated with (e.g., in the same entry as) the destination and VLAN-tag pair in the table 28.

If the forwarding table 28 does not have an entry corresponding to a unicast packet (e.g., does not include the packet's destination address and VLAN tag pair), then the packet is referred to as an "unknown" unicast packet. The forwarding logic 25 is configured to forward an unknown unicast packet like a broadcast or multicast packet. That is, the forwarding logic 25 forwards an unknown unicast packet carried by an EVC to all of the ports 21-23 that are members of the EVC except for the port that received the packet on ingress to the node 12.

Note that the other nodes 13-14 are configured to similarly forward packets as the node 12. However, the nodes 12-14 are configured to enforce leaf isolation rules, as described above. In particular, a packet that is received via a leaf port of the network 10 may not be forwarded to another leaf port of the network 10, but a packet that is received via a root port of the network 10 may be forwarded to leaf ports and/or root ports of the network 10.

In this regard, the port data 29, 39, and 49, in the nodes 12, 13, and 14, respectively, indicate the leaf status of each port in the same respective node. That is, the port data within each node respectively indicates whether each port in the same node is a root port or a leaf port. As an example, the port data 29 is provisioned to indicate that port 21 is a root port and that ports 22-23 are intermediate ports. Further, the port data 39 is provisioned to indicate that port 31 is an intermediate port and that ports 32-33 are leaf ports, and the port data 49 is provisioned to indicate that the port 41 is an intermediate port, that port 42 is a root port, and that port 43 is a leaf port. The nodes 12-14 are configured to enforce the leaf isolation rules based on such port data 29, 39, and 49.

As an example, assume that the node 13 receives a multicast, broadcast, or unknown unicast packet via the leaf port 32. Normally, except for enforcement of the leaf isolation rules, the node 13 would forward such packet to both ports 31 and 33. However, since port 33 is a leaf port and since the packet was received from another leaf port 32, as indicated by the port data 39, the forwarding logic 35 forwards the packet only to port 31.

Now assume that a multicast, broadcast, or unknown unicast packet is received via root port 21. Such packet is forwarded to the node 14, and the forwarding logic 45 determines to forward the packet to the ports 42 and 43. Since the packet was received on ingress to the network 10 via a root port 21, the forwarding logic 45 does not need to limit the ports 42 and 43 that receive the packet based on the leaf isolation rules.

Note that the port data 29, 39, and 49 indicate the leaf status for ports on a per EVC basis. That is, the same port may be a leaf port for one EVC and a root port for another. To determine the port's status for a given packet, the VLAN tag from the packet is used to retrieve from the port data the port's appropriate leaf status for the EVC identified by the VLAN tag.

In one exemplary embodiment, to enable enforcement of the leaf isolation rules, each node 12-14 upon receiving a packet on ingress to the network 10 is configured to control a field in the packet's header to indicate to the other nodes of the network 10 whether the packet is received via a leaf port or a root port. Thus, the other nodes can analyze such field to make proper forwarding decisions such that the leaf isolation rules are enforced. Note that various fields can be used to indicate the leaf status of the port that received the packet on ingress to the network 10. The leaf status of the port that received a respective packet on ingress to the network 10 shall be referred to hereafter as the packet's "leaf status." In one exemplary embodiment, the packets are Ethernet packets, and the TPID field of each Ethernet packet is used to indicate the packet's leaf status, and exemplary techniques for controlling the TPID field and enforcing the leaf isolation rules will be described in more detail below. However, it should be emphasized that other protocols can be employed, and other fields can be used to indicate the packet's leaf status in other embodiments.

Figure 3:
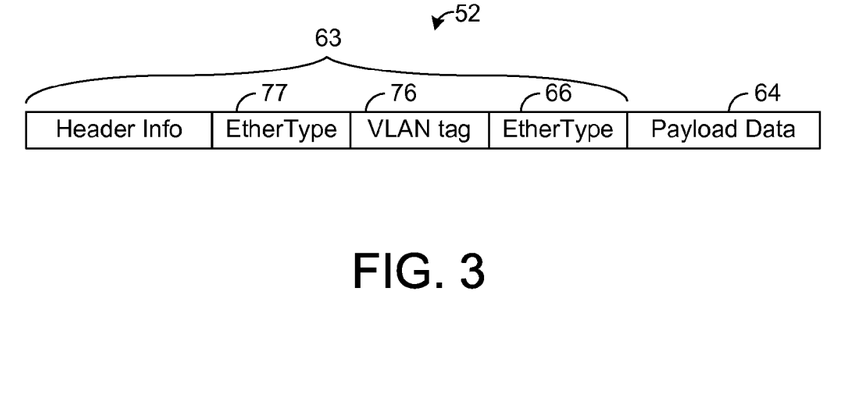
FIG. 3 is a block diagram illustrating an exemplary data packet communicated through a tree network, such as is depicted by FIG. 1.

FIG. 3 depicts an exemplary Ethernet packet 52. The packet 52 has a header 63 and payload data 64. The header 63 comprises various information, such as a destination address and source address, that is used by the nodes 12-14 to make forwarding decisions. The header 63 also has fields referred to as "EtherType" fields. There is one EtherType field 66 that immediately precedes the payload data 64. Such field 66 generally indicates the type of information that comprises the payload data 64. As an example, if the payload data 64 is an Internet Protocol (IP) packet that has been encapsulated into an Ethernet packet 52, the EtherType field 66 indicates that the packet 52 is carrying an IP packet as its payload data 64.

In some cases, as is shown by FIG. 3, the packet 52 may have a VLAN tag 76, such as an S-tag, in its header 63. In such case, the VLAN tag 76 is immediately preceded by an EtherType field 77 indicating that the following field 76 is a VLAN tag. In this regard, I.E.E.E. 802.3Q specifies certain predefined code words that may be used for an EtherType field. Some of the code words indicate that the information following the EtherType field is a VLAN tag. One such code is used for the EtherType field 77 shown by FIG. 3 to indicate that the following field 76 is a VLAN tag. Such an EtherType field 77 that precedes a VLAN tag (and indicates that the following field is a VLAN tag) is sometimes referred to as a tag protocol identifier (TPID) or TPID field.

Generally, the same TPID is used for the same VLAN tag for all packets carrying such VLAN tag. Certain network components, such as a router (not shown) coupled to the network 10, are configured to drop the packet if the packet's TPID field 77 does not have the proper TPID code word consistent with the VLAN tag 76 that follows it.

As used herein, the term "ingress node" shall be used with respect to a given packet and shall refer to the node 12-14 that receives the packet on ingress to the network 10. Further, the term "egress node" shall be used with respect to a given packet and shall refer to the node 12-14 that transmits the packet at the edge of the network 10 on egress. Thus, if a packet is received by port 32 on ingress to the network 10 and transmitted from the node 14 via the port 42, then the node 13 shall be referred to as the packet's ingress node, and the node 14 shall be referred to as the packet's egress node. If the packet received by the port 32 is instead transmitted from the nodes 12 and 14 via ports 21 and 43, then both nodes 12 and 14 shall be referred to as egress nodes. Thus, a given packet may have more than one egress node.

In one exemplary embodiment, a packet's ingress node is configured to control the packet's TPID field 77 based on the leaf status of the port that received the packet on ingress to the network 10. In particular, the ingress node is configured to control the packet's TPID field 77 to indicate the packet's appropriate leaf status. There are various techniques that can be used to so control the TPID field 77.

As an example, in one exemplary embodiment, the ingress node is configured to leave the TPID field 77 unchanged if the packet 52 is received via a root port on ingress to the network 10. For example, if a packet 52 is received by the node 12 on ingress to the network 10 via the root port 21, then the node 12 is configured to refrain from changing the packet's TPID field 77. Further, each node 12-14 is aware of the code word that should be in the TPID field 77 upon ingress to the network 10 based on its VLAN tag. In this regard, each node 12-14 is provisioned such that each VLAN tag is correlated with such TPID value. The correlation may be in the node's forwarding table or elsewhere, such as the node's port data. When a node (e.g., node 14) receives the packet 52 from the node 12, the node 14 compares the code word of the packet's TPID field 77 to the TPID value correlated with the packet's VLAN tag by the node's forwarding table 48 or otherwise. If there is a match, then the node 14 is aware that the code word in the TPID field 77 has not been changed by the ingress node 12, and the packet 52, therefore, was received on ingress to the network 10 via a root port.

However, the ingress node is configured to replace the code word of the TPID field 77 with a new code word if the packet 52 is received via a leaf port on ingress to the network 10. For example, if a packet 52 is received by the node 13 on ingress to the network 10 via the leaf port 32, then the node 13 is configured to replace the packet's code word in the TPID field 77 with a new code word. The new code word is predefined and recognized by all of the nodes 12-14. In particular, each node 12-14 is configured to determine that a packet 52 was received via a leaf port on ingress to the network 10 if its TPID field 77 has the new code word. Thus, any of the nodes 12-14 can analyze the TPID field 77 of a packet 52 to determine the packet's leaf status.

Note that the TPID field 77 can be controlled via other techniques to indicate a packet's leaf status. For example, the ingress node may be configured to change the TPID field 77 only if the packet 52 is received by a root port on ingress to the network 52. Thus, if the packet 52 has a changed TPID field 77, then the packet 52 has been received by a root port rather than a leaf port on ingress to the network 10. In another example, the TPID field 77 may be changed regardless of its leaf status. For example, the original code word of the TPID field 77 may be changed by the ingress node to a new code word having one value if it is received by a root port and to a new cord word having another value if it is received by a leaf port. Yet other techniques of controlling the TPID field 77 are possible in other examples.

When a packet's egress node receives the packet 52, the egress node is configured to ensure that the packet 52 is transmitted from the network 10 with the same code word in the TPID field 77 as existed in the packet 52 upon ingress to the network 10. In this regard, if the TPID field 77 has been modified by the ingress node, then the egress node changes the TPID field 77 back to its original value. Accordingly, components downstream of the egress node are not affected by the use of the TPID field 77 as a leaf status indicator while the packet 52 is traversing through the network 10.

Using the TPID field 77 as a leaf status indicator, as described above, allows the nodes 12-14 to enforce the leaf isolation rules without requiring modification of the current Ethernet packet format specified by current Ethernet standards. Further, since the egress node ensures that the packet 52 is transmitted from the network 10 on egress without a changed TPID field 77 relative to the TPID field 77 on ingress to the network 10, the network 10 does not violate Ethernet standards or cause any downstream component to mishandle (e.g., drop) the packet 52.

Figure 4:
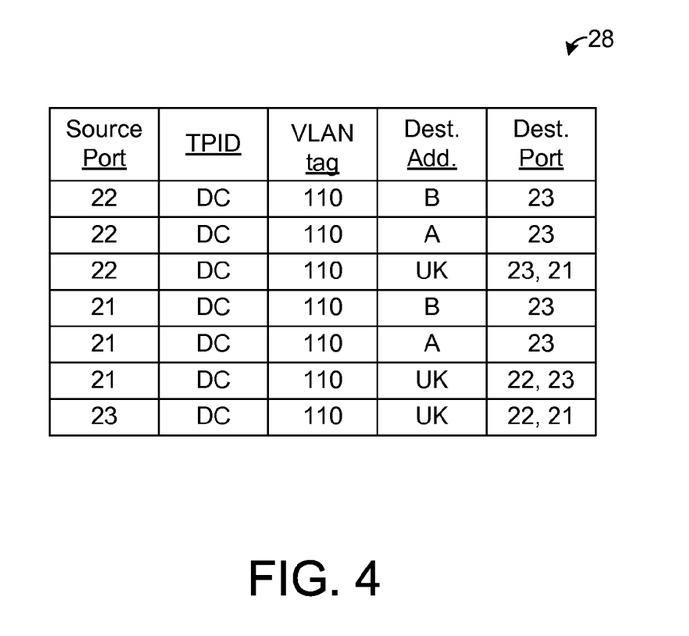
FIG. 4 depicts an exemplary forwarding table for a node, such as is depicted by FIG. 1.
Figure 5:
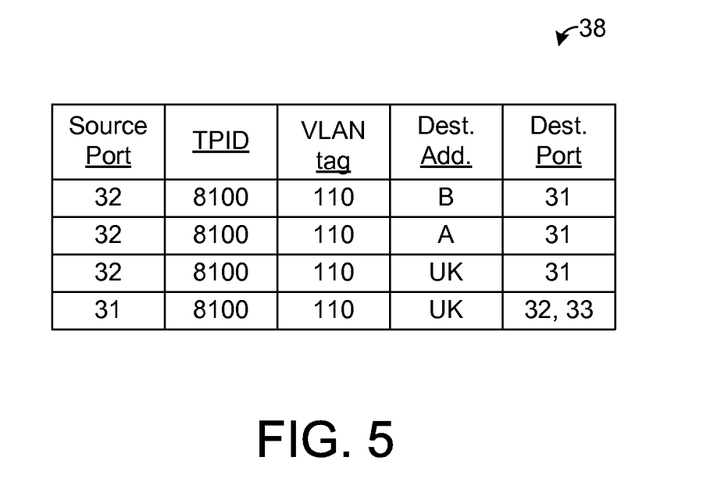
FIG. 5 depicts an exemplary forwarding table for a node, such as is depicted by FIG. 1.
Figure 6:
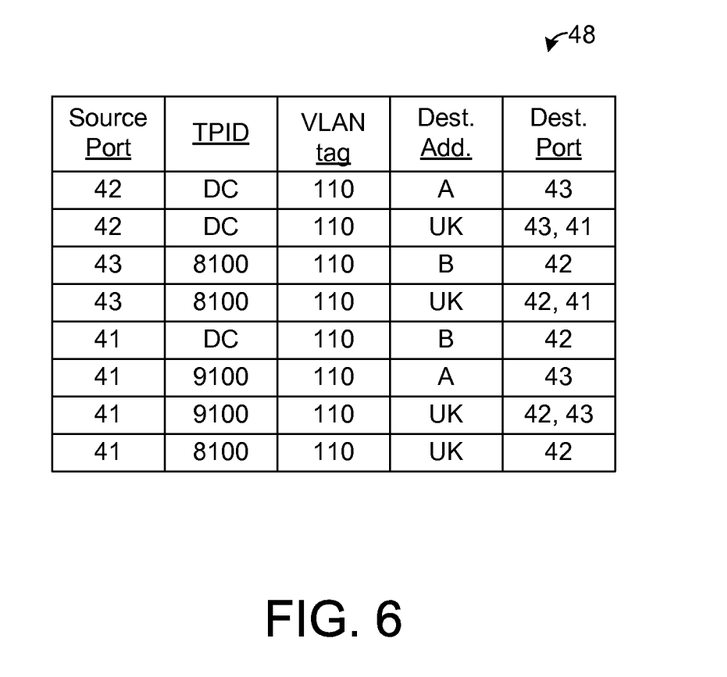
FIG. 6 depicts an exemplary forwarding table for a node, such as is depicted by FIG. 1.

An exemplary use and operation of the network 10 will now be described below. For illustrative purposes assume that the forwarding tables 28, 38, and 48 are provisioned as shown by FIGS. 4-6, respectively. The term "Source Port" in the forwarding table of a node refers to the port identifier of the port within the same node that received the packet 52. Each port identifier in the forwarding tables shall have same value as the corresponding reference number in FIG. 1 for the identified port. Thus, the port 21 in FIG. 1 shall be identified by the port identifier "21" in the forwarding tables, the port 22 in FIG. 1 shall be identified by the port identifier "22" in the forwarding tables, and so on. Note that the forwarding table 28, 38, and 48 are not necessarily complete, and such forwarding tables 28, 38, and 48 may have other entries in other embodiments.

Further assume that the VLAN tag of the packets carried by the EVC implemented by the network 10 is "110." Also assume that the code word for the TPID field 77 of such packets has a value of "9100" on ingress to the network 10. In addition, the term "Destination Port" or "Dest. Port" refers to the port identifier or identifiers of the port or ports to which a packet 52 is to be forwarded, and the term "UK" refers to a destination address that is unknown. The term "DC" in the forwarding tables refers to don't care. For example, for an entry having "DC" in its TPID column, a packet 52 can have any value in its TPID field 77 and still be correlated with the entry provided that the other header information, such as VLAN tag and destination address, match the header parameters in the entry. As will be apparent in the below description, the forwarding tables 28, 38, and 48 are provisioned such that the leaf isolation rules are enforced by the nodes 12-14 when making forwarding decisions based on the tables 28, 38, and 48.

Assume that a unicast packet 52 having an VLAN tag value of "110" and a destination address "C," which is unknown to the forwarding tables 28, 38, and 48 or, in other words, not stored in the forwarding tables 28, 38, and 48, is received on ingress to the network 10 via the leaf port 32 of the node 13. As indicated above, the code word in the TPID field 77 of the packet 52 has a value of "9100."

Figure 7:
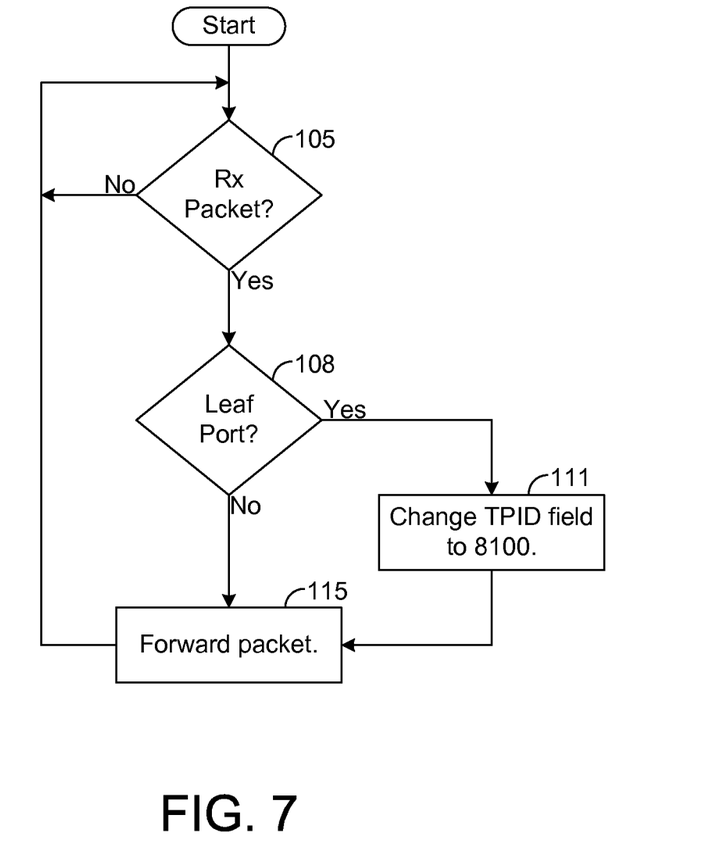
FIG. 7 is a flow chart illustrating an exemplary method for handling a data packet at an ingress node of a tree network, such as is depicted by FIG. 1.

As shown by blocks 105 and 108 of FIG. 7, the node 13 is configured to determine the packet's leaf status when it is received by the leaf port 32. In this regard, the forwarding logic 35 is configured to analyze the port data 39 to determine whether the ingress port 32 is a leaf port or a root port. In the current example, the ingress port 32 is a leaf port, and the forwarding logic 35 makes a "yes" determination in block 108. Thus, the forwarding logic 35 modifies the TPID field 77 of the packet 52 by replacing the code word value "9100" with a predefined code word value, which is "8100" in the current embodiment, as shown by block 111 of FIG. 7. Note that other values may be used in other embodiments both for the original TPID value and the modified TPID value.

After adjusting the TPID field 77, if appropriate, the forwarding logic 35 then forwards the packet 52 according to its forwarding table 38, as shown by block 115 of FIG. 7. Since the destination address is unknown, the packet 52 is forwarded only to port 31 based on the forwarding table 38, as shown by the third entry of the forwarding table 38 in FIG. 5. In this regard, since ports 32 and 33 are both leaf ports, forwarding the packet to the leaf port 33 would violate the leaf isolation rules. Accordingly, the forwarding table 38 is provisioned such that the packet 52 is forwarded only to the port 31.

Figure 8:
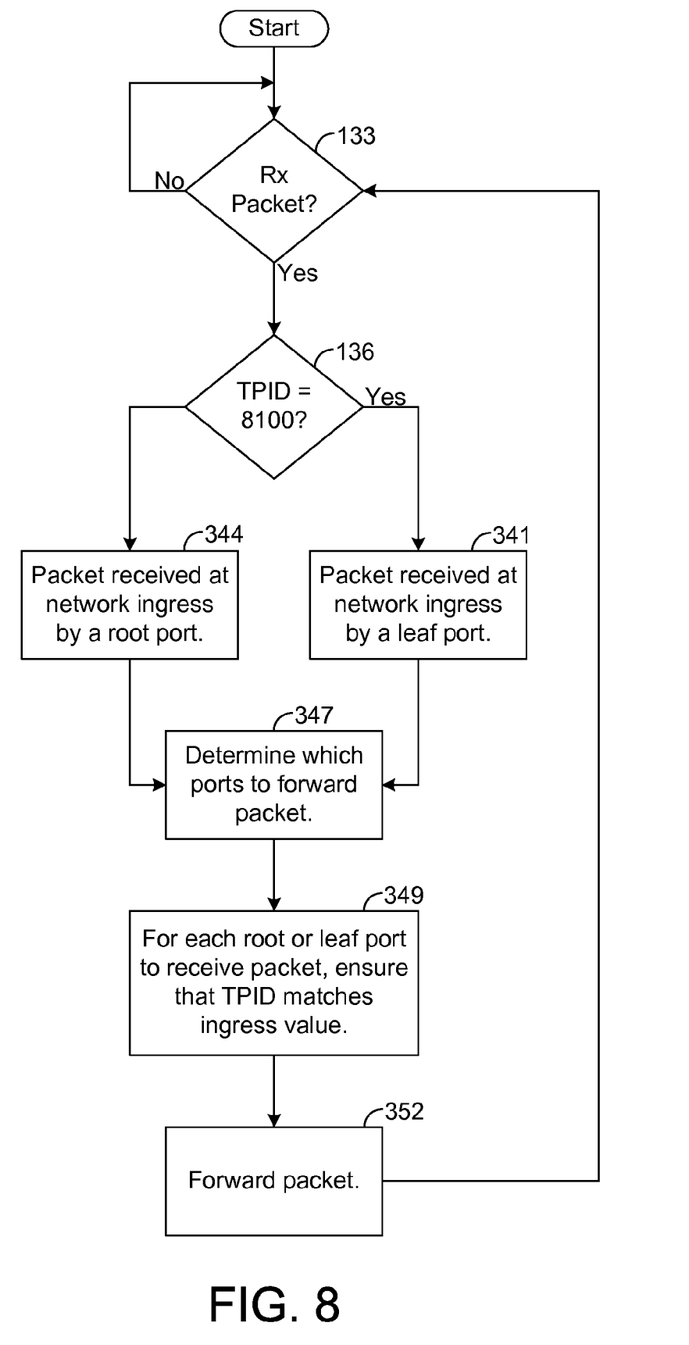
FIG. 8 is a flow chart illustrating an exemplary method for handling a data packet at an intermediate node or an egress node of a tree network, such as is depicted by FIG. 1.

Upon receiving the packet 52, the forwarding logic 25 of the node 12 analyzes the TPID field 77 to determine the packet's leaf status, as shown by blocks 133 and 136 of FIG. 8. In this regard, the forwarding logic 25 determines whether the code word of the TPID field 77 is equal to a value of "8100." If so, then the logic 25 classifies the packet 52 as being received on network ingress by a leaf port, as shown by block 341 of FIG. 8. If not, then the logic 25 classifies the packet 52 as being receive on network ingress by a root port, as shown by block 344 of FIG. 8. In the instant example, the packet's ingress node 13 has modified the code word in the TPID field 77 to be equal to "8100" indicating that the ingress port of the packet 52 is a leaf port. Accordingly, the forwarding logic 25, based on the forwarding table 28, ensures that the packet is not forwarded to a leaf port. In this regard, the forwarding logic 25 accesses the entry in the forwarding table 28 correlated with an unknown destination address and a TPID value of "8100" and retrieves the port identifiers of such entry thereby determining to which ports the packet 52 is to be forwarded, as shown by block 347 of FIG. 8.

In the instant example, the forwarding logic 25 determines that the packet 52 is to be forwarded to ports 21 and 23 based on the forwarding table 28, as shown by the third entry of the forwarding table 28 in FIG. 4. However, port 21 is a root port at an edge of the network 10. Thus, as shown by block 349 of FIG. 8, the forwarding logic 25 modifies the TPID field 77 of the packet 52 forwarded to the port 21. In particular, the logic 25 changes the value of the code word in the TPID field 77 from "8100" to "9100" so that the code word of the TPID field 77 is the same at network egress relative to network ingress. The forwarding logic 25, however, does not change the TPID field 77 of the packet 52 forwarded to the intermediate port 41. After performing block 349, the logic 25 in block 352 forwards the packet 52 to the ports 21 and 23 identified in block 347.

Note that there are a variety of ways that the forwarding logic 25 may be aware of the value to which the TPID field 77 should be changed. As indicated above, the value of the TPID field is generally the same for all packets carried by the EVC, and such TPID value may be provisioned in the nodes 12-14. As an example, the TPID value may be correlated with the EVC's VLAN tag in the forwarding table 28 or elsewhere, such as the port data 29. The forwarding logic 25 is configured to find the TPID value based on the EVC identifier in the packet and to then insert the TPID value into the field 77.

The packet 52 forwarded to port 23 is received by the port 41 of the node 14 and, as described above, has a TPID code word equal to "8100," indicating that the ingress port of the packet 52 is a leaf port. The node 14 handles the packet 52 according to the method used by the node 12. Thus, the packet 52 is forwarded to port 42 only. In this regard, since the port 43 is a leaf port, the packet 52 cannot be forwarded to such port 43 without violating the leaf isolation rules. Moreover, according to the last entry of the table 48 shown by FIG. 6, the forwarding logic 45 forwards the packet 52 to root port 42, and the logic 45 then replaces the code word in the TPID field 77 with a value of "9100," in implementing block 349 of FIG. 8. Since the packet 52 is received by a leaf port and not forwarded to any other leaf port, the packet 52 is effectively forwarded through the network 10 without violating the leaf isolation rules. Further, as the packet 52 leaves the network 10, its TPID field 77 is adjusted to ensure that it matches the TPID field at network ingress.

Now assume that a packet 52 with the same VLAN tag and destination address is received at network ingress via the port 21 of the node 12. In such case, the forwarding logic 25 does not adjust the TPID field 77 since the ingress port 21 is a root port instead of a leaf port. Thus, the packet 52 is forwarded to both nodes 13 and 14, and the node 14 handles the packet 52 differently relative to the previous example. In particular, since the code word of the TPID field is equal to "9100" indicating the ingress port of the packet 52 is a root port, the forwarding logic 45 forwards the packet 52 to both ports 42 and 43 based on the penultimate entry of the forwarding table 48 shown by FIG. 6. In addition, since the code word of the TPID field 77 is already equal to "9100," there is no need for the forwarding logic 45 to adjust the TPID field 77 in implementing block 349 of FIG. 8.

The invention claimed is:

1. A multi-node tree network, comprising:
a first node at an edge of the multi-node tree network, the first node having a plurality of ports and configured to receive via one of the ports an Ethernet data packet having a header and payload data, the header having a tag protocol identifier (TPID) field comprising a first value, the first node configured to adjust the TPID field thereby changing the first value to a second value based on whether the one port of the first node is a root port or a leaf port such that the TPID field indicates a leaf status of the data packet; and
a second node at an edge of the multi-node tree network, the second node having a plurality of ports, including at least a first port and a second port, the second node configured to receive the Ethernet data packet from the first node via the first port and to forward the Ethernet data packet to the second port based on the TPID field adjusted by the first node, wherein the second node is configured to insert the first value into the TPID field, wherein the Ethernet data packet ingresses into the multi-node network via the first node and egresses from the multi-node tree network via the second node.

2. The network of claim 1, wherein the first node is configured to adjust the TPID field based on a virtual local area network (VLAN) tag of the Ethernet data packet.

3. The network of claim 1, wherein the first value indicates that a field following the TPID field is a virtual local area network (VLAN) tag.

4. The network of claim 1, wherein the first value indicates whether a virtual local area network (VLAN) tag follows the TPID field in accordance with Ethernet protocol.

5. A multi-node tree network, comprising:
a first node at an edge of the multi-node tree network, the first node configured to receive an Ethernet data packet on ingress to the multi-node tree network, the Ethernet data packet having a header and payload data, the header having a virtual local area network (VLAN) tag and a tag protocol identifier (TPID) field, the first node configured to adjust the TPID field based on the VLAN tag and which port of the first node receives the Ethernet data packet such that the TPID field indicates a leaf status of the Ethernet data packet; and
a second node at an edge of the multi-node tree network, the second node configured to receive the Ethernet data packet and to forward the Ethernet data packet based on the TPID field, the second node further configured to transmit the Ethernet data packet such that the Ethernet data packet egresses the multi-node tree network from the second node.

6. The network of claim 5, wherein the TPID field has a first value when received by the first node, wherein the first node is configured to change the first value to a second value, and wherein the second node is configured to change the TPID field to the first value.

7. The network of claim 6, wherein the second node has a first port to receive the Ethernet data packet from the first node, wherein the second node is configured to forward the Ethernet data packet to a second port of the second node, and wherein the second node is configured to change the TPID field to the first value in response to a determination that the second port of the second node is one of a group including: a leaf port and a root port.

8. The network of claim 5, wherein the TPID field indicates that the VLAN tag follows the TPID field in the Ethernet data packet.

9. A method for use in a multi-node tree network, comprising:
receiving, via a port of a first node at an edge of the multi-node tree network, a data packet on ingress to the multi-node tree network, the data packet having a header and payload data, the header having a field comprising a first value indicating that a virtual local area network (VLAN) tag follows in the header of the data packet;
determining, at the first node, whether the port is a leaf port;
adjusting the first value at the first node based on the determining thereby changing the first value to a second value, the second value indicating a leaf status of the packet;
transmitting the data packet to a second node at an edge of the multi-node tree network;
selecting, at the second node, a port of the second node based on the second value in the field;
adjusting the second value in the field at the second node;
forwarding the data packet to the selected port; and
transmitting the data packet from the selected port such that the data packet egresses the multi-node tree network.

10. The method of claim 9, wherein the adjusting the second value in the field comprises inserting the first value into the field thereby changing the second value to the first value.

11. The method of claim 9, wherein the adjusting the second value in the field comprises changing the second value in the field to the first value.

12. The method of claim 9, wherein the data packet is an Ethernet data packet, and wherein the field is a tag protocol identifier (TPID) field of the Ethernet data packet.

13. The method of claim 12, wherein the adjusting the second value comprises generating the first value at the second node using the VLAN tag of the Ethernet data packet and inserting the first value into the TPID field thereby changing the second value to the first value.

14. The method of claim 12, wherein the first value indicates whether a virtual local area network (VLAN) tag follows the TPID field in the header in accordance with Ethernet protocol.

15. A method for use in a multi-node tree network, comprising:
receiving, via a port of a first node at an edge of the multi-node tree network, an Ethernet data packet having a header and payload data, the header having a tag protocol identifier (TPID) field comprising a first value indicating whether a virtual local area network (VLAN) tag is included in the Ethernet data packet;
determining, at the first node, whether the port is a leaf port;
adjusting the TPID field based on the determining thereby changing the first value to a second value, the second value indicating a leaf status of the Ethernet data packet;
transmitting the Ethernet data packet to a second node at an edge of the multi-node tree network;
selecting, at the second node, a port of the second node for forwarding the Ethernet data packet based on the second value in the TPID field;
inserting the first value into the TPID field at the second node;
forwarding the Ethernet data packet to the selected port;

transmitting the Ethernet data packet from the selected port such that the Ethernet data packet egresses the multi-node tree network; and determining whether the port of the second node is one of a group including: a leaf port and a root port, wherein the inserting is performed based on the determining whether the port of the second node.

16. A multi-node tree network, comprising:

a first node at an edge of the multi-node tree network, the first node having a plurality of ports and configured to receive via one of the ports a data packet having a header and payload data, the header having a field comprising a first value, the first node configured to adjust the field thereby changing the first value to a second value based on whether the one port of the first node is a root port or a leaf port such that the field indicates a leaf status of the data packet; and a second node at an edge of the multi-node tree network, the second node having a plurality of ports, including at least a first port and a second port, the second node configured to receive the data packet from the first node via the first port and to forward the data packet to the second port based on the field adjusted by the first node, wherein the second node is configured to insert the first value into the field, wherein the data packet ingresses into the multi-node network via the first node and egresses from the multi-node tree network via the second node, wherein the first value indicates that a virtual local area network (VLAN) tag follows in the header of the data packet.

* * * * *